(12) United States Patent
Fuller, Jr. et al.

(10) Patent No.: US 6,574,233 B1
(45) Date of Patent: Jun. 3, 2003

(54) ARRANGEMENT FOR REDEFINING AN INTERFACE WHILE MAINTAINING BACKWARDS COMPATIBILITY

(75) Inventors: Billy G. Fuller, Jr., Westminster, CO (US); Donald G. Koch, Broomfield, CO (US); Victor Medrano, Thornton, CO (US); Richard D. Miller, Northglenn, CO (US); Michael A. Smith, Broomfield, CO (US); Richard A. Windhausen, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/289,516

(22) Filed: Apr. 9, 1999

(51) Int. Cl.[7] .............................................. H04L 12/28
(52) U.S. Cl. ........................ 370/421; 370/282; 710/305
(58) Field of Search ................................ 710/306, 312, 710/63, 305, 21, 128, 129, 15, 10, 101, 100; 705/410; 345/161; 712/33, 35; 370/401, 489, 252, 257, 282, 386, 402, 419, 421, 451, 463

(56) References Cited

U.S. PATENT DOCUMENTS 5,761,460 A * 6/1998 Santos et al. ............... 710/305
5,778,252 A * 7/1998 Sangveraphunsiri et al. .. 710/21
5,781,748 A * 7/1998 Santos et al. ............... 710/312
5,864,688 A * 1/1999 Santos et al. ............... 710/306

* cited by examiner

Primary Examiner—Hassan Kizou
Assistant Examiner—John Pezzlo
(74) Attorney, Agent, or Firm—David Volejnicek

(57) ABSTRACT

Disclosed is a way of enhancing capabilities of an interface, such as a communications bus (100), while retaining backwards compatibility of the interface. The bus has a plurality of signal lines (250) including critical control signal lines. Legacy devices (102–103) present a legacy interface to each other over the bus by communicating with each other via a legacy protocol (251) over the bus. Critical control signals of the legacy protocol are conveyed by the critical control signal lines. New devices (104–105) present an enhanced interface to each other over the same bus by communicating with each other via an enhanced protocol (252) over the bus. Control signals of the enhanced protocol are conveyed by signal lines other than the critical control signal lines for the legacy protocol, so that the critical control signal lines remain idle or invalid for the legacy protocol. The new devices signal to each other an intent to use the enhanced protocol by sending a signal on a signal line (253) that is not used by the legacy protocol. The new devices preferably can communicate on the bus via either protocol, and thus can communicate not only with each other but also with the legacy devices.

14 Claims, 4 Drawing Sheets

FIG. 2

| PIN | LEGACY (M BUS) SIGNAL | EXTENDED (EM BUS) SIGNAL | PIN | LEGACY (M BUS) SIGNAL | EXTENDED (EM BUS) SIGNAL | PIN | LEGACY (M BUS) SIGNAL | EXTENDED (EM BUS) SIGNAL | PIN | LEGACY (M BUS) SIGNAL | EXTENDED (EM BUS) SIGNAL |
|---|---|---|---|---|---|---|---|---|---|---|---|
| 324 |  |  | 224 |  |  | 124 |  |  | 024 |  |  |
| 323 | D12 | ~EBE1 | 223 | D13 |  | 123 | D14 | ~EBTOER | 023 | D15 |  |
| 322 | D8 | ~EDLE | 222 | D9 | ERD/~WR | 122 | D10 | ~EBE3 | 022 | D11 | ~EBE2 |
| 321 | D4 | EAD28 | 221 | D5 | EAD29 | 121 | D6 | EAD30 | 021 | D7 | EAD31 |
| 320 | D0 | EAD24 | 220 | D1 | EAD25 | 120 | D2 | EAD26 | 020 | D3 | EAD27 |
| 319 | ale | ~EALE | 219 | dp0 | EADP3 | 119 | qp1 | EADP1 | 019 | dp1 | ~EDPER |
| 318 |  |  | 218 | qp0 | EADP0 | 118 |  |  | 018 | qp2 | EADP2 |
| 317 | A20 | EAD20 | 217 | A21 | EAD21 | 117 | A22 | EAD22 | 017 | A23 | EAD23 |
| 316 | A16 | EAD16 | 216 | A17 | EAD17 | 116 | A18 | EAD18 | 016 | A19 | EAD19 |
| 315 | A12 | EAD12 | 215 | A13 | EAD13 | 115 | A14 | EAD14 | 015 | A15 | EAD15 |
| 314 | A8 | EAD8 | 214 | A9 | EAD9 | 114 | A10 | EAD10 | 014 | A11 | EAD11 |
| 313 | A4 | EAD4 | 213 | A5 | EAD5 | 113 | A6 | EAD6 | 013 | A7 | EAD7 |
| 312 | A0 | EAD0 | 212 | A1 | EAD1 | 112 | A2 | EAD2 | 012 | A3 | EAD3 |
| 311 |  |  | 211 | ~BHE |  | 111 | ~WR |  | 011 |  |  |
| 310 | ~RD |  | 210 | ~IOR |  | 110 | ~IOW |  | 010 |  |  |
| 309 |  |  | 209 | ~S0 |  | 109 |  |  | 009 | ~XACK | ~EACK |
| 308 | ~S1 |  | 208 | ~S2 |  | 108 | Q0 |  | 008 |  |  |
| 307 |  |  | 207 |  |  | 107 |  |  | 007 |  |  |
| 306 |  |  | 206 |  |  | 106 | ~mee | ~EBUSY | 006 |  |  |
| 305 |  |  | 205 |  |  | 105 |  |  | 005 |  |  |
| 304 |  |  | 204 |  |  | 104 |  |  | 004 |  |  |
| 303 |  |  | 203 |  |  | 103 |  |  | 003 |  |  |
| 302 |  |  | 202 |  |  | 102 |  |  | 002 |  |  |
| 301 |  |  | 201 |  |  | 101 |  |  | 001 |  |  |
| 300 |  |  | 200 |  |  | 100 |  |  | 000 |  |  |

US 6,574,233 B1

ARRANGEMENT FOR REDEFINING AN INTERFACE WHILE MAINTAINING BACKWARDS COMPATIBILITY

TECHNICAL FIELD

This invention relates to interfaces between apparati in general and to computer communications buses in particular.

BACKGROUND OF THE INVENTION

An interface is a definition, as well as an embodiment of that definition, of how an apparatus interacts with another apparatus. An example of an interface is a computer communications bus, which defines how devices that are connected to the bus communicate with each other across the bus.

Over time, interfaces tend to become obsolete, inadequate for present needs. For example, a computer bus that supports only 14-bit addresses may have been adequate when computer memories were relatively small (e.g., 16 Kbytes), as was the number of devices interconnected by the bus, but is inadequate today when computer memories and the numbers of interconnected devices must be expanded to be relatively large (e.g., 4 Gbytes of memory) and hence require a greater range (e.g., 32 bits) of addresses. One approach to solving this problem is to throw away the now-obsolete interface design and come up with a new one. But this makes the entire system that is built around the interface obsolete. Not only must the interface be redesigned and replaced, but the controller for that interface and the apparatuses that used the old interface must also be replaced. This is a very undesirable, expensive, often economically unfeasible thing to do. Another approach is to use any spare, unused, capacity of the existing interface to extend the capabilities of the interface. However, in some cases, there does not exist any such suitable spare capacity.

SUMMARY OF THE INVENTION

This invention is directed to solving these and other problems and disadvantages of the prior art. Generally according to the invention, a first device couples to a second and a third device, for example, via a physical connection (e.g., a bus) that is common to all three of the devices. The second device presents a first interface (e.g., uses a first protocol) over the connection, while the third device presents a second interface (e.g., uses a second protocol) different from the first interface over the connection. The second interface provides capabilities different from (e.g., additional to, or that cannot be provided by) those provided by the first interface. The first device has an interface arrangement that effects and presents the first interface to the second device on the connection and effects and presents the second interface to the third device on the connection.

An advantage of this approach is that it allows one to design new devices which fit into an existing bus structure, but which can communicate at a higher data rate or with a different bus configuration (increase address, data, etc.). This also allows one to keep existing devices in the system, and more importantly, it preserves the existing system backplanes and carriers. The old devices ignore the new bus accesses, while continuing to accept the old ones. The new devices either accept the new style accesses only, or support a mixture of both, so that software can be reused if the device is a replacement for an older device which accepted old-style accesses only.

Preferably, the first device has a way of signalling use of the second interface to the third device. Illustratively, this involves sending across the connection a signal that is either not used or not recognized by the first interface, or sending a signal across a signal lead of the connection that is not used by the first interface. This tells the third device whether to communicate using the first or the second interface.

Also illustratively, the connection is a communications bus that has a plurality of signal lines for conducting a first set of signals (a first protocol), including critical control signal lines for conducting critical control signals of the first set of signals. The first device transmits or receives the first set of signals on the signal lines, including transmitting and receiving the control signals on the control signal lines. The first device also transmits or receives a second set of signals (a second protocol) including control signals, on the signal lines other than the critical control signal lines for the first protocol. Leaving the critical control signal lines for the first protocol of the connection idle in the latter case ensures that devices which communicate via the first set of signals (the first interface) remain oblivious to the communications via the second set of signals (the second interface).

These and other features and advantages of the invention will become more apparent from the following description of an illustrative embodiment of the invention taken together with the drawing.

BRIEF DESCRIPTION OF THE DRAWING

FIG. 2 is a table showing the legacy interface and the extended interface defined by the bus of the computer system of FIG. 1;

DETAILED DESCRIPTION

Figure 1:
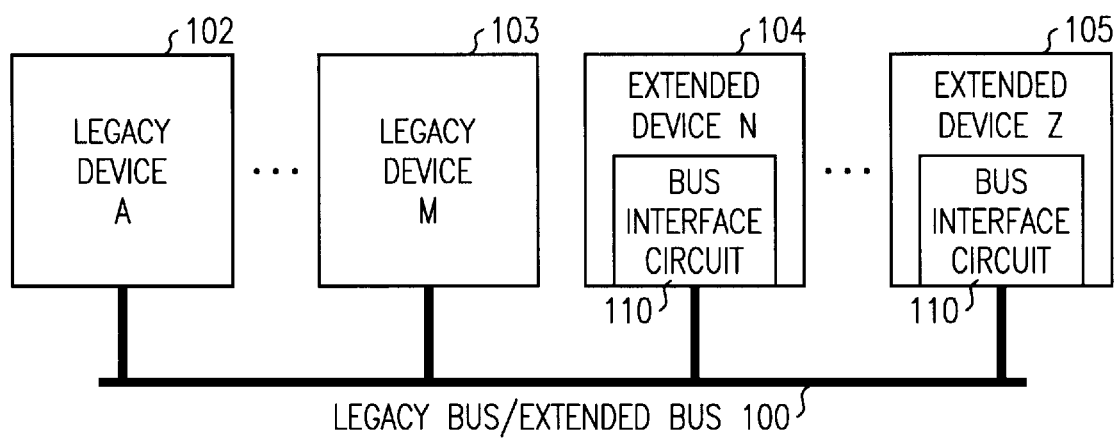
FIG. 1 is a block diagram of a computer system that includes an illustrative embodiment of the invention.

FIG. 1 shows an illustrative computer or communications system comprising a plurality of legacy devices 102–103 interconnected by a legacy bus 100. Illustratively, the computer system is a version of the Lucent DEFINITY® Enterprise Communications Server (ECS), bus 100 is the M bus of the Lucent DEFINITY ECS, and devices 102–103 include processors, memories, interfaces to the ECS switching fabric, etc. The interface definition implemented by the M bus is shown in the table of FIG. 2 by the columns designated "Legacy (M bus) signal". As described so far, the system of FIG. 1 is conventional.

According to the invention, a new interface definition is superimposed or overlayed on legacy bus 100 to form an extended bus 100. Physically, the legacy bus and the extended bus are one and the same bus. Functionally, however, bus 100 supports both the legacy interface definition and the new interface definition. This allows the old interface and devices 102–103 that use it to remain unchanged, thus preserving backwards compatibility with legacy equipment, while allowing for system development and growth through the addition of extended devices 104–105 to the system of FIG. 1. Extended devices 104–105 are interconnected and communicate via extended bus 100, and at least some of the extended devices 104–105 communicate with legacy devices 102–103 via legacy bus 100.

Figure 3:
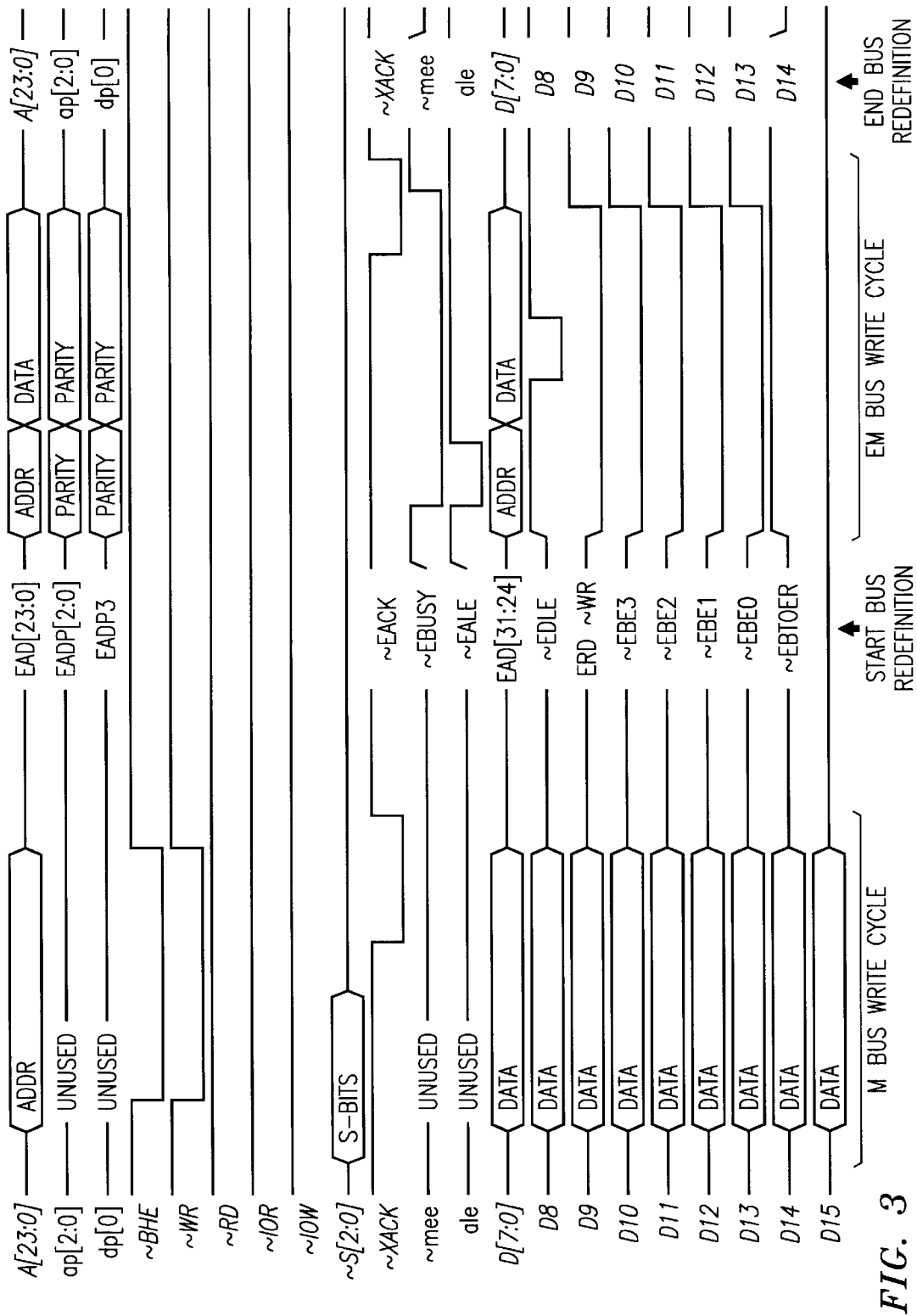
FIG. 3 is a timing diagram of bus write cycles of the legacy and extended interfaces of FIG. 2.

These include the ECS main processor which, as bus initiator, must present both the first and second interface, and therefore must be an extended device. Illustratively, extended bus 100 is an extended version of the M bus (EM bus) of the Lucent DEFINITY ECS. The interface definition implemented by the EM bus is shown in the table of FIG. 2 by the columns designated "Extended (EM bus) signal". For comparison purposes, FIG. 3 shows a bus 100 write cycle for each of the two interfaces defined in FIG. 2. Thus, even though the physical connection provided by bus 100 among devices 102–105 is common and identical to all devices 102–105, the interfaces presented to each other by various devices 102–105 via bus 100 are different.

The legacy interface of bus 100 is used by devices 102–105 in the conventional manner. But when one of the extended devices 104–105 intends to use the extended interface of bus 100, it must communicate this intent over bus 100 to other extended devices 104–105 without activating the legacy interface. When this intent is communicated to and received by another of the extended devices 104–105, that device switches from legacy interface mode of operation to extended interface mode of operation. Bus 100 is now considered to be the extended bus 100 offering the extended interface for the duration of the present bus transaction. The extended interface is defined such that the legacy interface remains inactive during that bus transaction. Illustratively, this is effected by not using, and leaving idle, critical control signal lines of the legacy interface during the extended mode of operation. Critical control signal lines are those that are indispensable to the operation of the legacy bus. When the bus transaction is completed, bus 100 reverts to acting as legacy bus 100 and offering the legacy interface.

Figure 4:
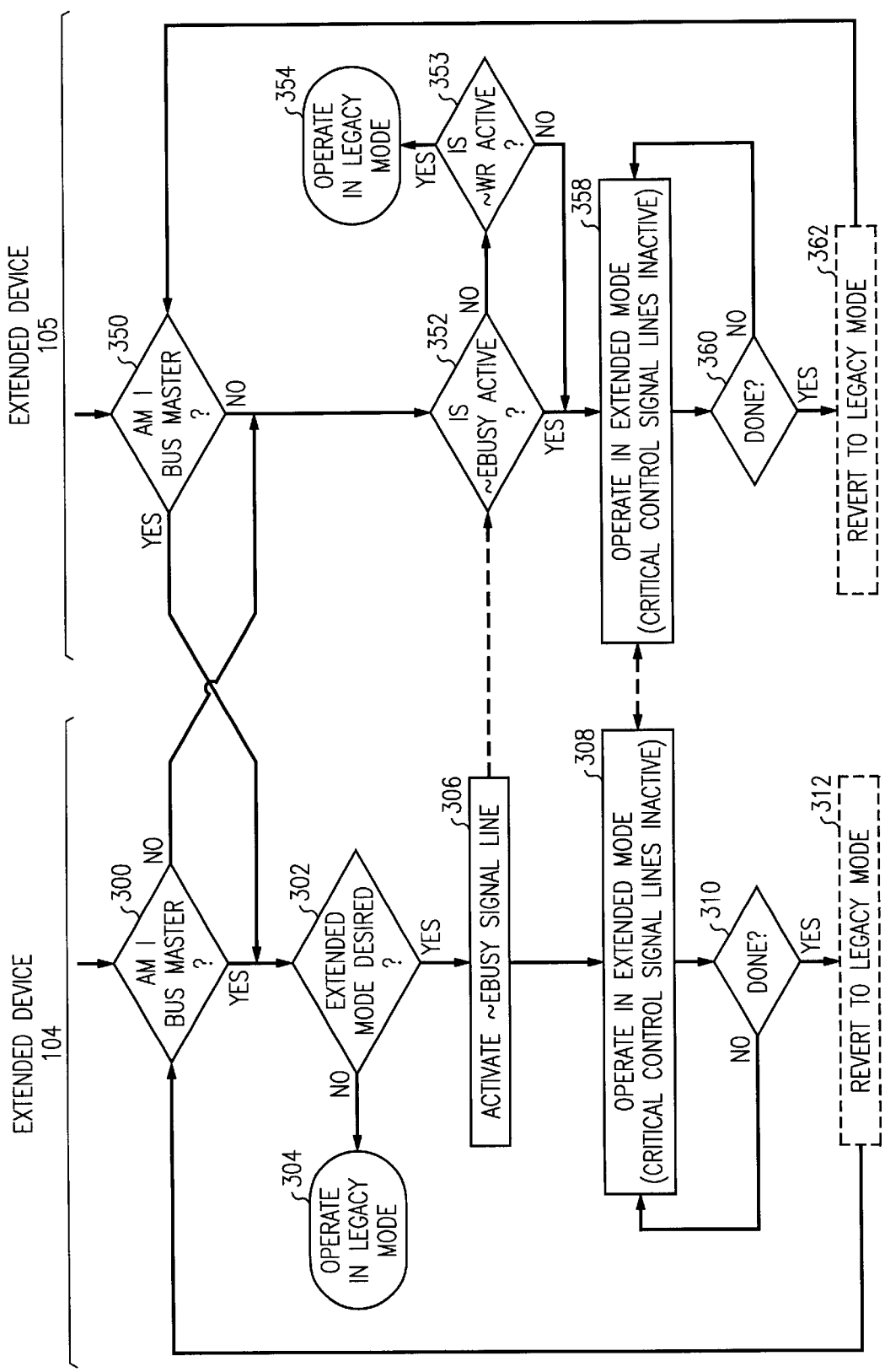
FIG. 4 is a functional flow diagram of operations performed by bus interface circuits of extended devices of the computer system of FIG. 1.

This functionality is illustrated in FIG. 4, which shows the interaction between a pair of extended devices 104 and 105. At the beginning of a bus 100 transaction cycle, a bus 100 interface circuit 110 of each device 104–105 checks whether its device is the bus master, at steps 300 and 350. (A device becomes bus master by winning bus access contention, for example. Alternatively, the state of the system (active, standby) determines who is bus master.) Assuming that device 104 determines that it is the bus master, its bus interface circuit 110 determines whether device 104 desires extended legacy mode of operation, at step 302. For example, bus interface circuit 110 is told by the function of device 104 that requires bus 100 access which mode of operation is desired. If legacy mode is desired, bus interface circuit 110 operates in the legacy mode in the conventional manner, at step 304. If extended mode is desired, bus interface circuit 110 generates a "key" signal on bus 100 to indicate the extended mode of operation, at a step 306. Illustratively, interface circuit 110 activates a signal line of bus 100 that is typically not used—either not used at all or at least not used during this phase of legacy bus 100 operation. In this illustrative implementation, the ~EBUSY signal line of the M bus is used. Alternatively, interface circuit 110 generates the "key" in the form of a unique and otherwise-unused signal sequence on a line or lines normally used for other purposes, at step 306. Interface circuit 110 also reconfigures itself to present on bus 100 the extended mode of operation as defined in FIG. 2, at step 308, and operates in the extended mode on bus 100 until the present bus transaction is completed, as determined at step 310. Bus interface circuit 110 then returns to step 300 to begin a new bus 100 transaction cycle. Optionally, prior to returning to step 300, bus interface circuit 110 may reconfigure itself to present the legacy mode of operation on bus 100 and resume the legacy mode of operation, including inactivating the ~EBUSY line, at step 312. But this is not strictly necessary, since a new "legacy "or" extended" operation decision is always made at step 302.

Assuming that a device 105 determines at step 350 that it is not the bus master, its bus interface circuit 111 checks whether the "key" signal is extant, e.g., whether ~EBUSY signal line of bus 100 is active, at step 352. If the "key" signal is not extant, bus interface circuit 110 checks whether a critical legacy interface control signal is present, e.g., ~WR signal (or alternatively another signal, such as ~RD, ~IORD, or ~IOWR) is active, at step 353. If a critical legacy-interface control signal is present, bus interface circuit 110 operates in the legacy mode in the conventional manner, at step 354. If the "key" signal is extant or a critical legacy-interface control signal is not extant, bus interface circuit 110 reconfigures itself to present on bus 100 the extended mode of operation as defined in FIG. 2, at step 358, and operates in the extended mode on bus 100 until the present bus transaction is completed, as determined at step 360. Bus interface circuit 110 then returns to step 350 to begin a new bus 100 transaction cycle. As in the case of step 312, bus interface circuit 110 may optionally reconfigure itself to present the legacy mode of operation on bus 100 and resume the legacy mode of operation, at step 362, prior to returning to step 350.

Of course, various changes and modifications to the illustrative embodiment described above may be envisioned. For example, the invention can be extended to encompass more that two modes of bus operation. It can be applied to an on-board bus or to any other bus or communications medium. Further, the "key" signal alone can be used to indicate the bus mode, thereby allowing the critical control signals from the first interface to be used by the second interface. Also, the key can bean analog voltage, a digital signal level, a tone, a normally-illegal bus condition, etc., or a sequence or combination of such conditions. Furthermore, the bus-interface control circuit can be centralized, rather then distributed. Yet further, the legacy and extended bus operations can be over lapped, at least in part, rather than be entirely sequential. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:
    a first device for coupling to a second and a third device via a physical connection that is common to all three said devices, wherein the second device presents a first interface to the first device over the connection, the first interface comprising signals on the connection having at least one of a first meaning and a first form, and the third device presents a second interface different from the first interface to the first device over the connection, the second interface comprising the signals on the connection having at least one of a second meaning and a second form different from the first meaning and the first form, respectively; and
    an interface arrangement of the first device, for effecting and presenting the first interface to the second device on the connection and effecting and presenting the second interface to the third device on the connection; wherein
        the second interface provides capabilities different from those provided by the first interface.

2. The apparatus of claim 1 wherein:

the second interface provides capabilities greater than capabilities provided by the first interface.

3. The apparatus of claim 1 wherein:

the second interface provides capabilities that cannot be provided by the first interface.

4. The apparatus of claim 1 wherein:

the interface arrangement uses a first communications protocol on the connection to provide the first interface and uses a second communications protocol, different from the first protocol, on the connection to provide the second interface.

5. The apparatus of claim 4 wherein:

the connection comprises a plurality of signal lines; and signals conveyed across individual said lines by the second protocol differ from signals conveyed across same said individual signal lines by the first protocol.

6. The apparatus of claim 5 wherein:

each said protocol comprises a plurality of signals including critical control signals;

the critical control signals of the first protocol are conveyed by first critical control signal lines of the connection; and the control signals of the second protocol including the critical control signals of the second protocol are conveyed by signal lines of the connection other than the first critical control signal lines.

7. The apparatus of claim 1 wherein:

the first device includes means for signalling use of the second interface to the third device.

8. The apparatus of claim 7 wherein:

the connection comprises a plurality of signal lines; and the signalling means sends a signal signalling the use of the second interface across a signal line not used by the first interface.

9. The apparatus of claim 7 wherein:

the signaling means sends across the connection a signal not used by the first interface and signalling the use of the second interface.

10. The apparatus of claim 7 wherein:

the signalling means sends across the connection a signal that is not recognized by the first interface and signalling the use of the second interface.

11. A method of interfacing a first device to a second device and a third device via a physical connection that is common to all three said devices, comprising:

the second device presenting a first interface to the first device over the connection, the first interface comprising signals on the connection having at least one of a first meaning and a first form;

the third device presenting a second interface different from the first interface to the first device over the connection, the second interface comprising the signals on the connection having at least one of a second meaning and a second form different from the first meaning and the first form, respectively;

the first device presenting the first interface to the second device and presenting the second interface to the third device over the connection; wherein the second interface provides capabilities different from capabilities provided by the first interface.

12. A device connectable to a common communications bus having a plurality of signal lines for conducting a first set of signals, including first control signal lines for conducting control signals of the first set of signals, the device including:

first means for transmitting or receiving the first set of signals on the signal lines, including individual signals having at least one of a first meaning and a first form; and second means for transmitting or receiving a second set of signals on the signal lines, including the individual signals having at least one of a second meaning and a second form different from the first meaning and the first form, respectively, including transmitting and receiving control signals of the second set of signals, on the signal lines other than the first control signal lines; whereby the device is able to communicate on the bus with devices that communicate exclusively via the first set of signals as well as with devices that communicate via the second set of signals.

13. The device of claim 12 in combination with:

the communications bus;

at least one device that communicates via the first set of signals; and at least one device that communicates via the second set of signals.

14. A method of communicating between three devices connected by a communications bus common to the three devices and having a plurality of signal lines including first critical control signal lines, comprising:

a first one and a second one of the three devices communicating with each other by transmitting and receiving exclusively signals of a first set of signals on the signal lines of the bus, including individual signals having at least one of a first meaning and a first form, including transmitting and receiving critical control signals of the first set of signals on the first critical control signal lines; and the first one and a third one of the three devices communicating with each other by transmitting and receiving signals of a second set of signals on the signal lines of the bus, including the individual signals having at least one of a second meaning and a second form different from the first meaning and the first form, respectively, including transmitting and receiving control signals of the second set of signals on signal lines other than the first critical control signal lines.

* * * * *